United States Patent [19]

Scheurenbrand

[11] 4,450,880
[45] May 29, 1984

[54] FILLER PIPE FOR A FUEL TANK

[75] Inventor: Dieter Scheurenbrand, Ostfildern, Fed. Rep. of Germany

[73] Assignee: Daimler-Benz Aktiengesellschaft, Fed. Rep. of Germany

[21] Appl. No.: 458,532

[22] Filed: Jan. 17, 1983

Related U.S. Application Data

[63] Continuation of Ser. No. 218,680, Dec. 22, 1980, abandoned.

[30] Foreign Application Priority Data

Dec. 22, 1979 [DE] Fed. Rep. of Germany ....... 2952175

[51] Int. Cl.$^3$ .............................................. B65B 1/04
[52] U.S. Cl. .................................. 141/285; 220/86 R
[58] Field of Search ................ 141/59, 285, 290, 291, 141/292, 301, 307, 308, 309, 392; 251/149.2; 220/86 R

[56] References Cited

U.S. PATENT DOCUMENTS

| | | | |
|---|---|---|---|
| 3,187,936 | 6/1983 | Downing | 141/285 |
| 3,330,439 | 7/1967 | Moorman | 220/86 R |
| 3,872,900 | 3/1975 | Götz | 220/86 R |
| 3,979,010 | 9/1976 | Fiedler et al. | 220/86 R |
| 4,122,968 | 10/1978 | Germain | 141/285 |
| 4,135,562 | 1/1979 | Martineau et al. | 141/285 |

FOREIGN PATENT DOCUMENTS

| | | |
|---|---|---|
| 2553881 | 6/1977 | Fed. Rep. of Germany . |
| 2829489 | 1/1980 | Fed. Rep. of Germany . |
| 2351029 | 12/1977 | France . |

Primary Examiner—Stephen Marcus
Assistant Examiner—Kenneth S. Putnam
Attorney, Agent, or Firm—Craig & Burns

[57] ABSTRACT

A filler pipe for a fuel tank, especially for motor vehicles, with a vent pipe running along an upper wall part of the filler pipe. The vent pipe terminates at a distance from an inlet opening or mouth of the filler pipe. A sloping baffle as well as a fuel nozzle support are arranged between the end of the vent pipe and the inlet opening of the filler pipe. The filler pipe with the vent pipe, sloping baffle, and nozzle support are formed in one piece of a synthetic resinous material, with the vent pipe being formed out of an upper side of the filler pipe and the baffle being formed by a drawn-in wall part of the filler pipe.

8 Claims, 1 Drawing Figure

U.S. Patent  May 29, 1984  4,450,880
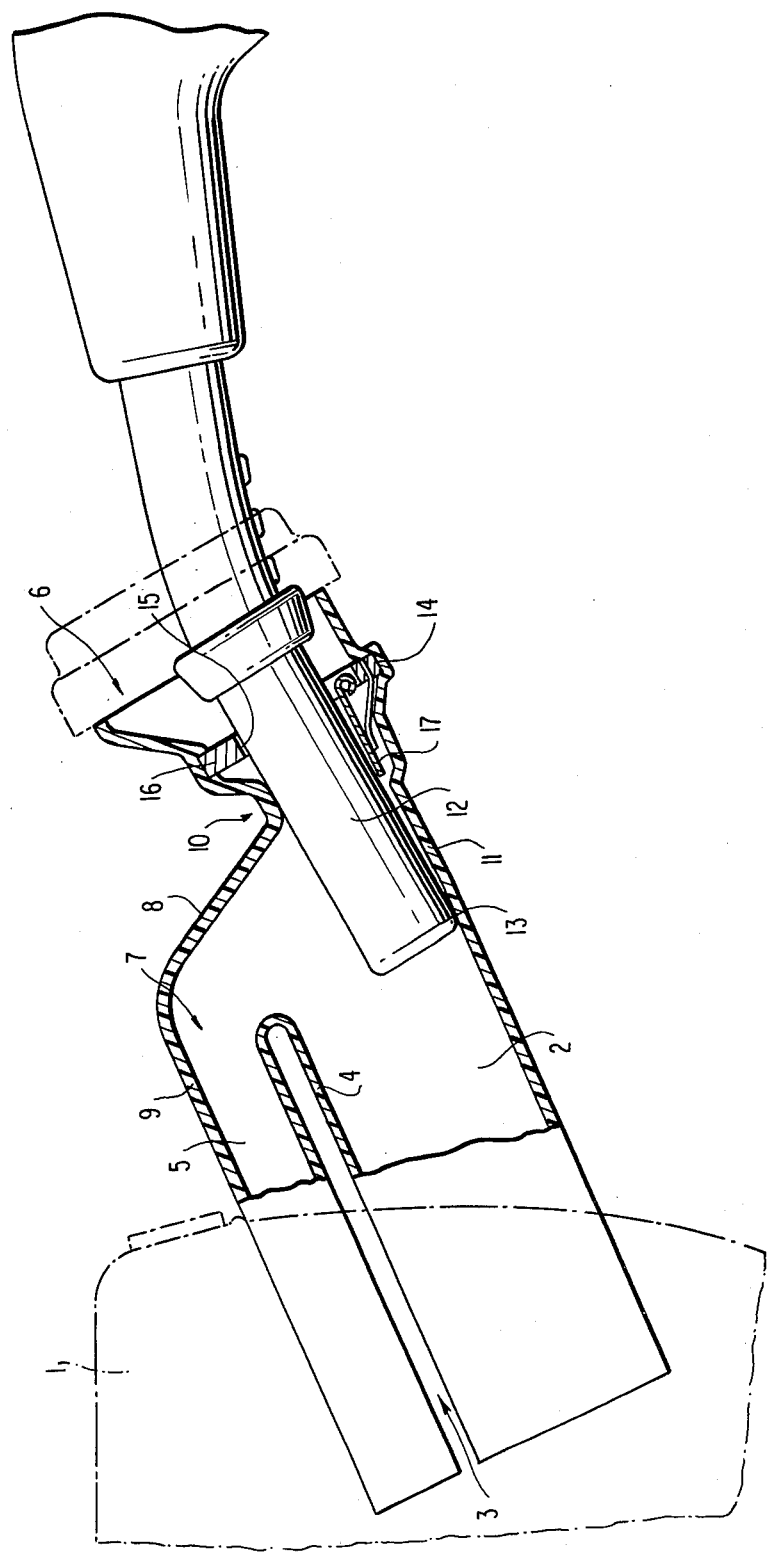

FILLER PIPE FOR A FUEL TANK

This is a continuation of application Ser. No. 218,680, filed Dec. 22, 1980, abandoned.

BACKGROUND OF THE INVENTION

The present invention relates to a filler pipe and, more particularly, to a filler pipe for a fuel tank of a motor vehicle which includes an air vent pipe, extending along an upper wall and terminating at a distance from a mouth or inlet opening of the filler pipe, a sloping baffle, and a fuel nozzle support arranged between the end of the air vent pipe and the inlet opening of the filler pipe.

During a refueling of a fuel tank, the volume of fuel in the tank increases, and the air contained in the tank must escape to prevent a backflow of the fuel. To enable an escape of the air and prevent a backflow, filler pipes with vent pipes have been proposed, with the vent pipes being arranged in an upper area of the fuel tank. The height at which the vent pipe is arranged determines at the same time the filling level of the fuel tank since, if the fuel level reaches the level of the vent pipe, no air can escape from the fuel tank, and the fuel supply means, such as, for example, a fuel nozzle is shut off by the backflow of the fuel. Consequently, it is essential that the discharge pipe of the fuel supply nozzle opens only into the filler pipe so as not to permit a flow of fuel into the vent pipe.

A filler pipe of the aforementioned type is proposed in German Pat. No. 28 29 489 wherein a vent pipe has an inner groove serving for air circulation arranged in an interior thereof and a groove forming a sloping baffle in the filler pipe. The discharge opening of the vent pipe is provided with a bevelling in order to facilitate a mounting of the vent pipe into the filler pipe by means of spot welding. Additionally, a holding or support means is secured at the filler pipe for enabling a supporting of a fuel delivery nozzle.

One disadvantage of the above proposed filler pipe construction resides in the fact that it is very expensive to manufacture. A further disadvantages resides in the fact that the installation of the pipe is expensive due to the relatively complicated structure which requires an excessive expenditure of both time and effort for installation.

SUMMARY AND OBJECTS OF THE INVENTION

The aim underlying the present invention essentially resides in providing a filler pipe of the aforementioned type which enables a satisfactory refueling and ventilation of fuel tanks.

In accordance with advantageous features of the present invention, a filler pipe is provided wherein a vent pipe, a sloping baffle portion, and a fuel nozzle support are all formed as an integral, one-piece member.

By virtue of the above-noted features of the present invention, the filler pipe may be manufactured in a single work step by simple means and without the incurring of additional assembly costs.

In accordance with the present invention, the filler pipe with the vent pipe, sloping baffle portion, and fuel mozzle support are manufactured from a synthetic resinous material, with the vent pipe being formed out of a top side of the filler pipe. The filler pipe of the present invention is advantageously manufactured by blow-molding with the vent pipe being squeezed or pinched out. However, it is also possible to attach the vent pipe to the filler pipe in a predetermined form through other manufacturing processes.

In accordance with further features of the present invention, the sloping baffle is formed by means of a suppressed wall part of the filler pipe. By virtue of this arrangement, the air often being carried over the splashing fuel during a shut off of the fuel nozzle, travels against the baffle and is diverted into the area of the filler pipe in a simple fashion, thereby preventing fuel particles from escaping from the opening of the filler pipe without requiring any additional further spcifically stuctured component parts.

Advantageously, in accordance with the present invention, the nozzle support is formed by providing a notch or indentation following the wall part forming the sloping baffle whereby the discharge pipe of the fuel nozzle is adjustably supported and is capable of being projected only into an area of the filler cap which allows no fuel to flow into the vent pipe during a refueling of the fuel tank. By virtue of these features of the present invention, it is not necessary to provide additionally arranged nozzle supports as with previously proposed constructions. In accordance with still further features of the present invention, the filler pipe may be provided at its inner circumference between the fuel nozzle support and the inlet opening or mouth with a circular slot or groove for holding a fitting piece, such as are used for motor vehicles which are only to be operated with unleaded gas. The fitting pieces are provided with an opening or aperture for accommodating the discharge pipe of the fuel nozzle, with the opening being of a sufficient diameter so as to only allow a discharge pipe which supplies unleaded gas to fit therethrough and not a discharge pipe for a fuel nozzle supplying leaded gas, thereby preventing a refueling of the fuel tank with improper fuel. The advantages of these features of the present invention over other proposed arrangements resides in the fact that the fitting piece may be pressed into a prefitted circular slot or groove without any additional assembly expenses and, advantageously, the fitting piece may be formed of either a synthetic resinous material or of a metal.

Accordingly, it is an object of the present invention to provide a filler pipe for a fuel tank of a motor vehicle which avoids, by simple means, shortcomings and disadvantages encountered in the prior art.

Another object of the present invention resides in providing a filler pipe for a fuel tank for motor vehicles which is simple in construction and therefore relatively inexpensive to manufacture.

Yet another object of the present invention resides in providing a filler pipe for a fuel tank for a motor vehicle which does not require complicated assembly procedures.

A further object of the present invention resides in providing a filler pipe for a fuel tank for motor vehicles which may be manufactured in a single working step without incurring additional assembly costs.

A still further object of the present invention resides in providing a filler pipe for a fuel tank for a motor vehicle which ensures the prevention of the flow of fuel into a vent pipe thereof.

These and other objects, features and advantages of the present invention will become more apparent from the following description when taken in connection with the accompanying drawing which shows, for purposes of illustration only, one embodiment in accordance with the present invention, and wherein:

BRIEF DESCRIPTION OF THE DRAWING

The single FIGURE of the drawing is a cross section through a filler pipe provided with a vent pipe constructed in accordance with the present invention.

DESCRIPTION OF THE PREFERRED EMBODIMENT

Referring now to the single FIGURE of the drawing, according to this figure, a filler pipe 2 produced by a blow-molding method, is arranged in an upper area of a fuel tank 1. A vent pipe 5 is formed, during production of the filler pipe 2, along an upper wall 4 by means of a pinching generally designated by the reference numeral 3. The vent pipe 5 has an exhaust or discharge area generally designated by the reference numeral 7 which is in open communication with an inlet opening or mouth generally designated by the reference numeral 6 of the filler pipe 2.

A sloping baffle 8 is disposed in opposition to the vent pipe 5 at a position spaced from the discharge area 7. The sloping baffle 8 follows a form of an upper wall part 9 of the vent pipe 5 and is part of the wall of the filler pipe 2. A notch or indentation generally designated by the reference numeral 10 is provided in a wall of the filler pipe 2 and upper area of the inlet opening 6, the form of which follows the one of the sloping baffle 8. The notch or indentation 10 supports with an accordingly shaped lower wall part 11 of the filler pipe 2 an inserted discharge pipe 12 of a fuel delivery nozzle in such a manner that the discharge pipe 12 may be inserted into the filler pipe 2 only to such an extent that a front lower edge 13 rests on the inner wall surface of the lower wall part 11.

A circular groove or slot 14 is arranged between the indentation or notch 10 forming a nozzle support and the inlet opening 6. The annular groove or slot 14 is arranged at the inner circumference of the filler pipe 1 and is adapted to accommodate a fitting piece 16. The fitting piece 16 has an opening 15 and a spring-loaded cover 17 which is adapted to be moved in a direction toward the fuel tank 1. The opening 15 is dimensioned so as to allow the insertion of a certain discharge pipe 12 having predetermined measurements. The spring-loaded cover 17 is opened in a direction of the fuel tank upon an insertion of the discharge pipe 12 of the fuel nozzle and assumes a normal position closing the opening 15 when the discharge pipe 12 of the fuel nozzle is withdrawn from the filler pipe 2.

As can readily be appreciated, the vent pipe 5 may also be formed of a predetermined shape using the blow-molding method directly at the filer pipe 2.

While I have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such changes and modifications as are encompassed by the scope of the appended claims.

I claim:

1. A one-piece filler arrangement for motor vehicle fue tanks comprising a filler pipe having an upper wall and an inlet opening, vent pipe means formed as apart of the upper wall for venting air from the fuel tank with one end of the vent pipe means terminating at a distance from the inlet opening, sloping baffle means formed from a drawn-in wall part of the upper wall of the filler pipe between the inlet opening of the filler pipe and the one end of the vent pipe, shaped means projecting generally inwardly between the inlet opening and the one end of the vent pipe for supporting a fuel nozzle, said shaped means being formed in part with said drawn-in wall part, wherein the direction of insertion of the fuel nozzle is controlled by the shaped means and direct flow of fuel from the fuel nozzle into the vent pipe is precluded.

2. The filler pipe according to claim 1, wherein the shaped means forming the nozzle support includes a notch disposed between the drawn-in wall part and the inlet opening of the filler pipe.

3. The filler pipe according to claim 2, wherein means are provided for fixing a diameter of the inlet opening of the filler pipe, and means are provided at an inner circumference of the filler pipe between the shaped means forming the nozzle support and the inlet opening for accommodating said diameter-fixing means.

4. The filler pipe according to claim 3, wherein the diameter-fixing means includes an annular fitting piece, and the accommodating means is an annular slot for receiving the fitting piece.

5. The filler pipe according to claim 4, wherein a spring-loaded cover means is mounted on the fitting piece for normally closing the inlet opening.

6. The filler pipe according to claim 1, wherein means are provided for fixing a diameter of the inlet opening of the filler pipe, and means are provided at an inner circumference of the filler pipe between the shaped means forming the nozzle support and the inlet opening for accommodating said diameter-fixing means.

7. The filler pipe according to claim 6, wherein the diameter-fixing means includes an annular fitting piece, and the accommodating means is an annular slot for receiving the fitting piece.

8. The filler pipe according to claim 7, wherein a spring-loaded cover means is mounted on the fitting piece for normally closing the inlet opening.

* * * * *